Patented Apr. 5, 1938

2,113,231

UNITED STATES PATENT OFFICE 2,113,231

DYESTUFFS OF THE ANTHRAQUINONE SERIES

Joseph Deinet, Milwaukee, Wis., assignor to E. I. du Pont de Nemours & Company, Wilmington, Del., a corporation of Delaware No Drawing. Application August 21, 1935, Serial No. 37,165

4 Claims. (Cl. 260—59)

This invention relates to the preparation of new dyestuffs of the anthraquinone series and has for its object the preparation of new acid wool dystuffs which dye in desirable blue shades and have excellent fastness properties.

I have found that when 4-hydroxy or 4-methoxy substituted 1-amino-anthraquinones are condensed with p,p'-dihalogen di-phenyl compounds in which the two phenyl groups are attached directly to each other or through carbon or oxygen or which are attached directly to each other and through carbon or oxygen, dyestuff intermediates are formed which can be readily sulfonated with weak oleum at ordinary temperature. The resulting dyestuffs dye wool in blue shades and are extremely fast to fulling, perspiration and light.

The following di-phenyl compounds will serve to illustrate the class of intermediates which I contemplate using in the preparation of this series of dyestuffs: p,p'-dibromo-diphenyl; p,p'-dibromo-diphenyl oxide; 2,7-dibromo-diphenylene oxide; 2,7-dibromo-fluorene; 2,7-dibromo-fluorenone; and p,p'-dibromo-diphenyl-methane; their isomers and corresponding chloro compounds.

The condensation is preferably carried out in the presence of high boiling solvents such as naphthalene, trichlorobenzene, etc., in the presence of an acid binding agent and a copper catalyst at temperatures ranging from about 175° C. upward. Temperatures above 220°, while operable, are not required for this reaction. The sulfonation of the condensation product is carried out at ordinary temperatures, using weak oleum, preferably in concentrations ranging from 2 to 5% $SO_3$.

The following examples are given to more fully illustrate my invention. The parts used are by weight.

Example 1

250 parts of naphthalene are heated to 100° C. Under agitation 17 parts of dry sodium carbonate, ½ part of copper powder, 34 parts of p,p'-dibromo-diphenyl and 50 parts of 1-amino-4-hydroxy-anthraquinone are added. The temperature is raised to 215° C. and held for 4 hours. The mass is cooled to 120° C. and poured into 2500 parts of alcohol, filtered at 40° C., washed with alcohol and hot water and dried. 50 parts of the dry condensation product are dissolved in 400 parts of 100% sulfuric acid at room temperature. Then about 100 parts of 24% oleum are slowly added at the temperature of 22–25° C. and the mass is stirred for ½ hour. The melt is poured into 3000 parts of water and ice and filtered. The cake is suspended in 500 parts of water and neutralized with NaOH 40% solution, filtered and dried. The product obtained dyes wool from an acid bath in bright blue shades, which are very fast to washing and light.

Example 2

250 parts of naphthalene are heated to 100° C. Under agitation 16 parts of dry sodium carbonate, ½ part of copper powder, 50 parts of 1-amino-4-methoxy-anthraquinone and 31 parts of p,p'-dibromo-diphenyl are added. The mass is heated to 215° C. and held at this temperature for 4 hours. It is then cooled to 120° C., poured into 2500 parts of alcohol, filtered at 40° C., washed with alcohol, hot water, and dried. 50 parts of the dry condensation product are dissolved in 400 parts of 100% sulfuric acid, 75 parts of 24% oleum are then added at 22–25° C. and stirred for ¾ hour. The melt is poured into 3000 parts of water and ice and filtered. The cake is suspended in 500 parts of water and neutralized with 40% NaOH solution, filtered and dried. The product obtained dyes wool from an acid bath in blue shades with a red cast.

Example 3

250 parts of naphthalene are heated to 100° C. under agitation and 17 parts of dry sodium carbonate, ½ part of copper powder, 47 parts of 1-amino-4-hydroxy-anthraquinone and 36 parts of p,p'-dibromo-diphenyl oxide are added. The mass is heated to 215° C. and held for 4½ hours, cooled to 120° C. and poured into 2500 parts of alcohol; filtered at 40° C., washed with alcohol and hot water and dried. 50 parts of the dry condensation product are dissolved in 300 parts of 100% sulfuric acid at room temperature. 100 parts of 25% oleum are then added at a temperature of 22–25° C. and stirred for 2–3 hours. The melt is poured into 2500 parts of water and ice and filtered. The cake is suspended in 500 parts of water and neutralized with NaOH 40% solution, filtered and dried. The product obtained dyes wool from an acid bath in bright violet blue shades.

Example 4

250 parts of naphthalene are heated to 100° C. While agitating, 17 parts of dry sodium carbonate, ½ part of copper powder, 47 parts of 1-amino-4-hydroxy-anthraquinone and 36 parts of dibromo-diphenylene oxide are added. The mass is heated to 215° C. and held for 6 hours, cooled to 130° C. and poured into 750 parts of solvent naphtha. The mass is filtered at 30° C., washed with alcohol and hot water and dried. 50 parts of the dry condensation product are dissolved in 300 parts of 100% sulfuric acid at room temperature. 150 parts of 25% oleum are then added at 22–25° C. and stirred for 1½ hours. The melt is poured into 3000 parts of water and ice and filtered. The cake is suspended in 500 parts of water and neutralized with NaOH 40% solution, filtered and dried. The product obtained dyes wool from an acid bath in bright violet blue shades.

*Example 5*

250 parts of naphthalene are heated to 100° C. Under agitation 16 parts of dry sodium carbonate, ½ part of copper powder, 47 parts of 1-amino-4-hydroxy-anthraquinone and 32 parts of p, p'-dibromo-diphenyl-methane are added. The mass is heated to 215° C. and held for 4½ hours. It is then cooled to 120° C. and poured into 2500 parts of alcohol, and stirred for several hours, then filtered, washed with alcohol and hot water and dried. 50 parts of the dry condensation product are dissolved in 300 parts of 100% sulfuric acid at room temperature. 100 parts of 25% oleum are then slowly added at 22–25° C. and stirred for 1½ hours. The melt is poured into 2500 parts of water and ice and filtered. The cake is suspended in 500 parts of water and neutralized with NaOH 40% solution. 50 parts of salt are added after stirring for ½ hour, then the mass is filtered and dried. The product obtained dyes wool from an acid bath in bright violet blue shades.

*Example 6*

250 parts of naphthalene are heated to 100° C. While agitating 16 parts of dry sodium carbonate, ½ part of copper powder, 47 parts of 1-amino-4-hydroxy-anthraquinone and 32 parts of 2,7-dibromo-fluorene are added. The mass is heated to 215° C. and held for 4½ hours, cooled to 120° C. and poured into 2500 parts of alcohol, filtered at 35° C., washed with alcohol, then with hot water and dried. 50 parts of the dry condensation product are dissolved in 300 parts of 100% sulfuric acid at room temperature. 100 parts of 25% oleum are slowly added and the mass stirred for 1½–2 hours at 22° C. It is then poured into 2500 parts of water and ice and filtered. The cake is suspended in 500 parts of water and neutralized with NaOH 40%. 50 parts of salt are added and the mass stirred for ½ hour, then filtered and dried. The product obtained dyes wool from an acid bath in blue shades.

The sulfonic acid group is introduced in the diphenyl radical, and not in the anthraquinone radicals, for the sulfonation is carried out at low temperatures. Due to the relatively good solubility of these compounds, they have excellent affinity for the fiber and dye in strong shades.

The term "sulfonic acid group" as used in the claims is intended to cover the alkali metal salt as well as the free sulfonic acid.

I claim:

1. Compounds of the formula

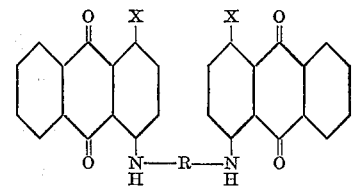

wherein X stands for a radical of the class consisting of —OH and —OCH$_3$ and R stands for an easily sulfonatable di-phenyl radical of the class consisting of diphenyl, diphenyl oxide, diphenylene oxide, diphenyl methane, fluorene, and fluorenone, in which the diphenyl radical contains a sulfonic acid group.

2. A compound of the following formula

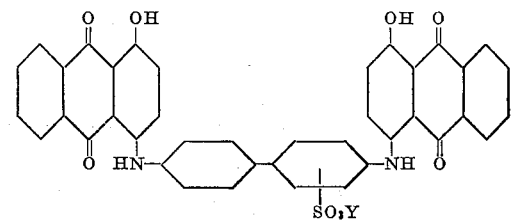

wherein Y stands for hydrogen or an alkali metal.

3. The process which comprises condensing a 1-amino-anthraquinone which contains in the 4 position a radical of the class consisting of —OH and —OCH$_3$ group with a dihalogen easily sulfonatable di-phenyl compound of the class consisting of diphenyl, diphenyl oxide, diphenylene oxide, fluorene, fluorenone and diphenyl methane, and sulfonating the resulting product at ordinary room temperatures.

4. The process which comprises condensing two molecular quantities of 1-amino-4-hydroxy-anthraquinone with one molecular quantity of p,p'-dibromo-di-phenyl and reacting the resulting product with weak oleum at ordinary room temperature.

JOSEPH DEINET.